Nov. 16, 1965   J. W. MOMBERG ETAL   3,218,530
MOTOR SPEED CONTROL BY SPACE TRANSMISSION
OF ELECTROMAGNETIC ENERGY
Filed Aug. 31, 1961   4 Sheets-Sheet 1

INVENTORS
James W. Momberg
Edward W. Taylor

INVENTORS
James W. Momberg
Edward W. Taylor 3,218,530
MOTOR SPEED CONTROL BY SPACE TRANSMIS-
SION OF ELECTROMAGNETIC ENERGY
James W. Momberg, Somerville, and Edward W. Taylor, Martinsville, N.J., assignors to The Singer Manufacturing Company, Elizabeth, N.J., a corporation of New Jersey
Filed Aug. 31, 1961, Ser. No. 135,250
1 Claim. (Cl. 318—16)

This invention relates to systems for controlling the speed of series commutator motors by space transmission of electromagnetic energy.

More particularly, this invention relates to motor control systems in which the body of the human operator forms part of the control energy transmission path.

Usually in motor control systems it is necessary to effect mechanical movement of a controller element, such as a variable impedance, to establish a speed setting for the motor. A classic example is the well-known series-resistance foot controller used to control the speed of electrical motor driven sewing machines.

It is desirable to eliminate the need for such a mechanically movable element along with the nuisance of wire connections between such controller and the motor itself.

This has been accomplished according to this invention by the provision of a control system in which an impedance located at the motor position is caused to vary responsively to a control signal transmitted through space with the body of the operator forming part of the transmission path. In this way, only the unresisted space coupling movement of the operator's foot or knee with respect to a stationary pick-up element is necessary to vary the amplitude of the signal transmitted to effect proportional speed control of the motor.

It is, therefore, an object of this invention to provide a motor speed control system in which signal energy locally generated or existing in the induction field set up by conventional A.C. house wiring, is transmitted through space and controlled by the body movements of a human operator without the use of any mechanically moved devices.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 1:
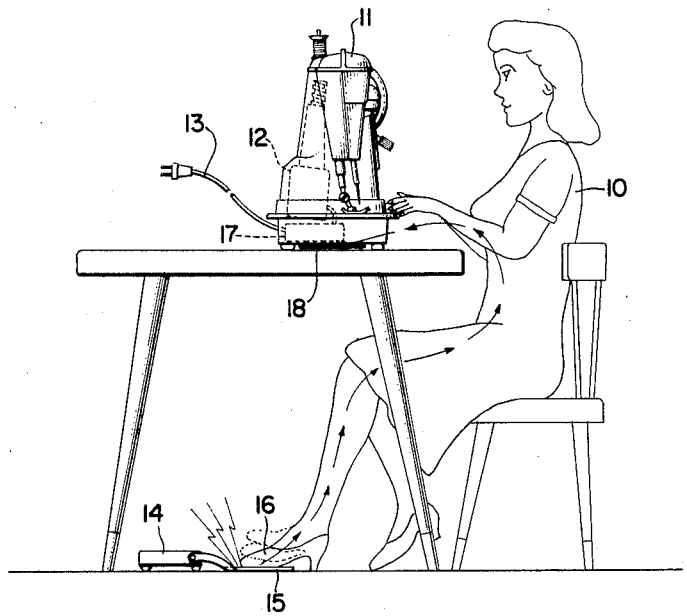
FIG. 1 shows the general arrangement of the parts of an embodiment of this invention used for controlling the speed of a sewing machine.

Referring to FIG. 1, a human operator 10 is seated in position before a sewing machine 11 driven by an electric motor 12. The motor 12 receives electrical energy through a cord 13 which is plugged into a conventional A.C. convenience outlet. A transmitter unit 14 for generating electromagnetic energy and located on the floor has a stationary output plate 15 which is space coupled to the operator's foot 16. A receiver and control unit 17, located within the sewing machine 11 has an antenna 16 which may comprise a short length of insulated wire located outside the sewing machine and which is space coupled to the operator's body. The path of flow of electromagnetic energy is shown diagrammatically by the arrows. It will be understood that the operator, by moving her foot 16 toward and away from the stationary plate 15, controls the amount of electromagnetic energy transmitted to proportionally control the speed of the motor 12 as will be explained presently.

Figure 2:
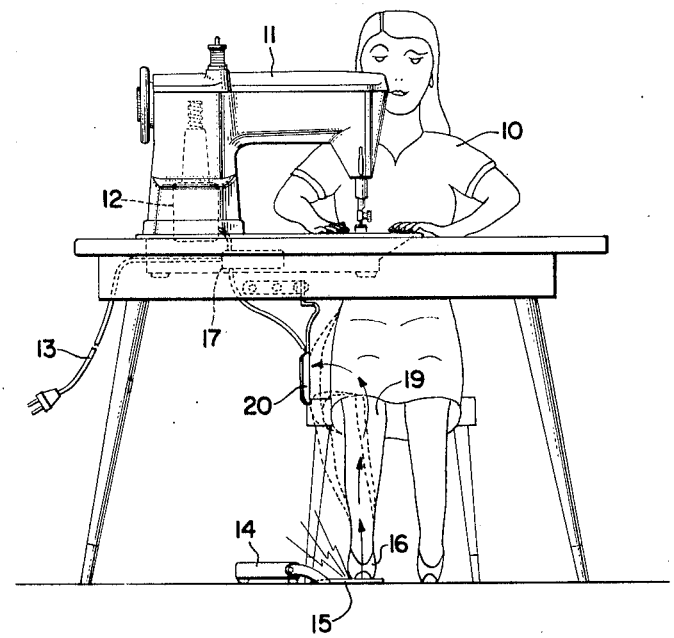
FIG. 2 shows a modification of the embodiment shown in FIG. 1.

Another arrangement using the same transmitter and receiver control units 14 and 17 as above is shown in FIG. 2. In this case, the operator 10 keeps her foot 16 positioned on the plate 15 and moves her knee 19 toward and away from an antenna 20 (which may be a plate or wire connected to the receiver unit 17) to effect speed control of the motor 12.

Figure 3:
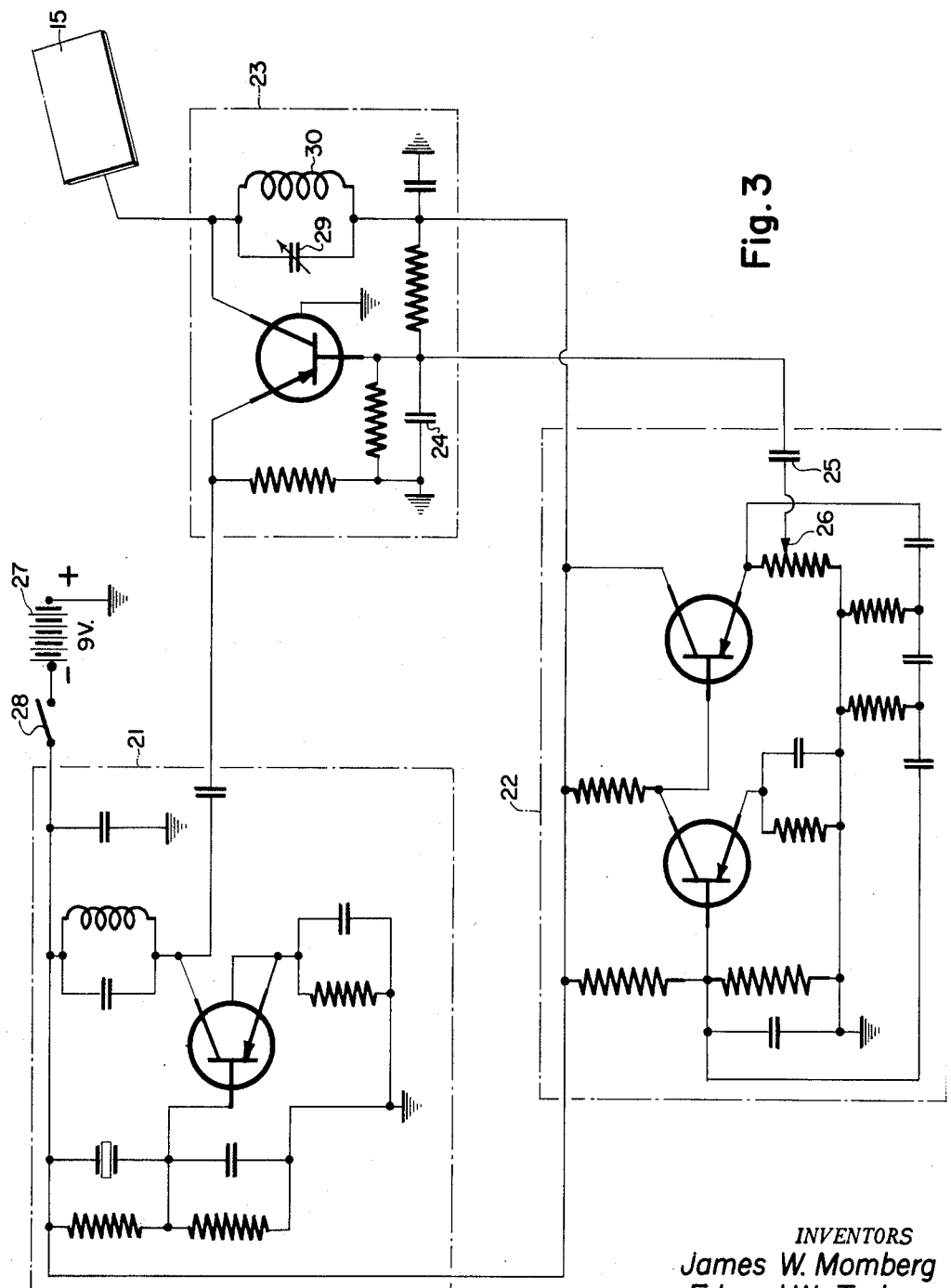
FIG. 3 is a schematic wiring diagram of the transmitter unit of FIGS. 1 and 2.

The circuit of the transmitter unit 14 is shown in FIG. 3 and comprises a crystal-controlled transistor oscillator 21 preferably generating an R.F. carrier frequency of 27.255 megacycles per second, which has been assigned by the Federal Communications Commission for radio controlled equipment. A phase-shift transistor audio oscillator 22 is used for tone modulating the carrier. This oscillator produces modulating frequencies in the 1000 cycles/second region. The final output stage 23 is a combination grounded base transistor R.F. amplifier and modulator. The base circuit is at ground potential for the carrier frequency because of the by-pass capacitor 24, yet its bias voltage is modulated by the audio frequency through the coupling capacitor 25. The percentage modulation is controlled by the setting of potentiometer 26. A 9 volt battery 27 supplies all power input for the transmitter through a switch 28. It will be understood that, when the switch 28 is closed, there is produced at the output plate 15 a 27.255 megacycles per second R.F. voltage, amplitude modulated at an audio frequency rate. Since the maximum D.C. voltage is 9 volts, there is no danger of shock from physical contact with the plate 15. The final tank circuit, comprising capacitor 29, inductance 30 and plate 15, is tuned to resonance when the operator 10 is in sewing position with her foot 16 on the plate 15. She then becomes, in effect, a 27.255 mc. antenna and the degree of coupling to the tank circuit is varied by varying the distance of her foot from the plate. This adjustment is not critical.

Figure 4:
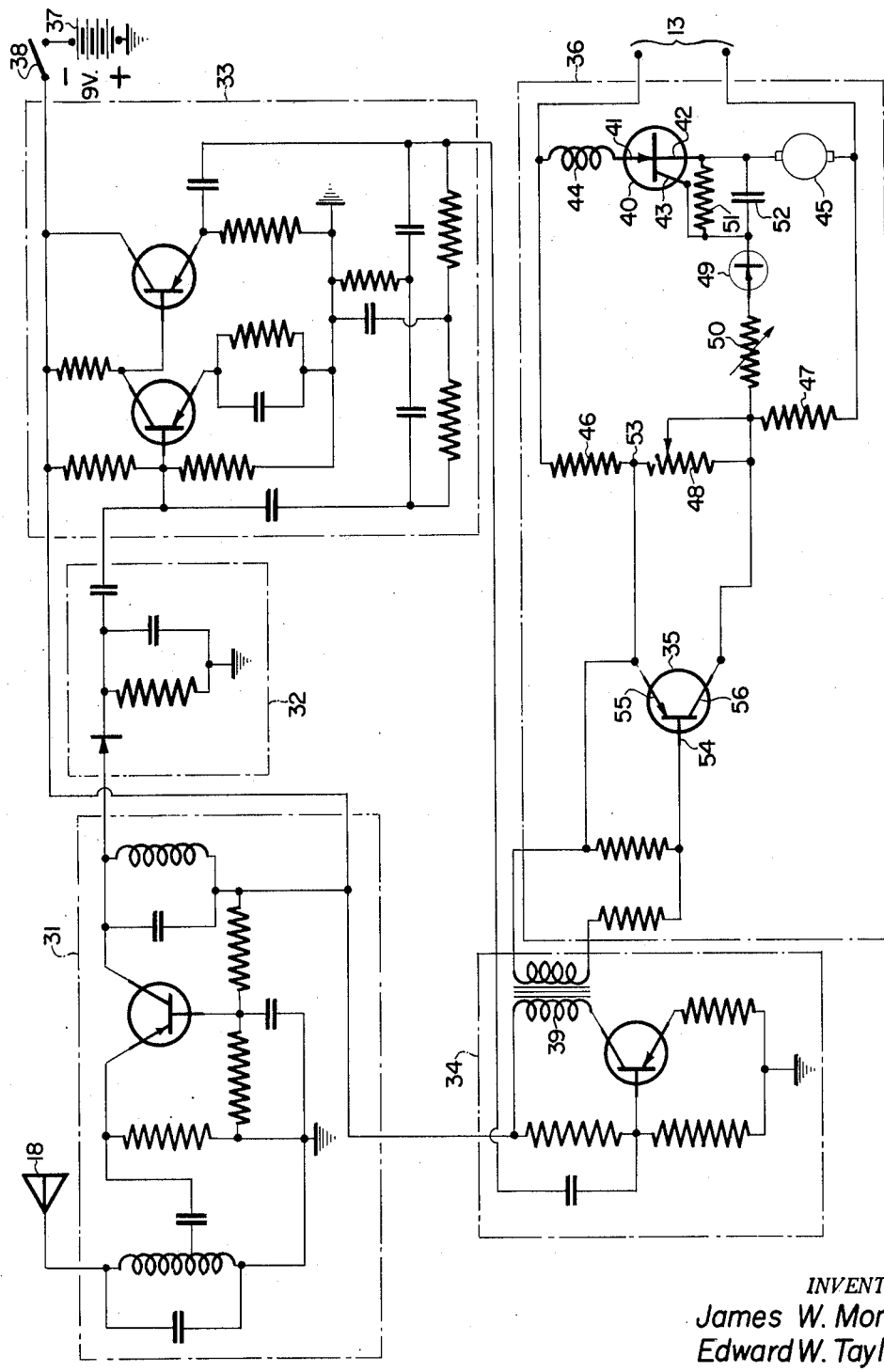
FIG. 4 is a schematic wiring diagram of the receiver and control units of FIGS. 1 and 2.

The receiver and control unit circuit is shown in FIG. 4 and comprises a transistor R.F. amplifier stage 31, a diode detector stage 32, a notched "T" transistor audio amplifier stage 33, an isolation transistor amplifier stage 34, a control transistor stage 35, and a solid-state controlled rectifier motor speed controlling circuit 36. A 9 volt battery 37 supplies input power for the receiver through a switch 38. This could also be obtained by a rectified supply from the A.C. line cord 13.

The carrier signal is picked up on the antenna 18 space coupled to the operator 10. The modulated carrier signal is amplified in the R.F. stage 31 and is applied to the detector stage 32 where the carrier signal is removed and the audio modulation signal is recovered and amplified in the "band pass" amplifier stage 33. This amplifier 33 has rather sharp selectivity in order to prevent any other 27.255 mc. carrier having other modulation frequencies from passing a signal for operating the motor 12. If, for example, a group of like sewing machines were installed very close to one another, one transmitter might operate two or three machines. To avoid this, each machine may be coded by having different modulation frequencies, the transmitter and receiver in each case having a matching, but different, modulation frequency.

From the amplifier stage 33, the modulation signal is capacitively coupled to the isolation amplifier stage 34 which feeds an output transformer 39. This isolation is for the purpose of decoupling the controlled rectifier stage 36 from the receiver section to prevent motor and rectifier noise from operating the receiver.

The circuitry of the transmitter and the receiver thus far described is a transistorized version of conventional circuits. The signal appearing across the secondary of transformer 39 is the modulation frequency of the carrier and it varies in amplitude in accordance with the coupling selectively provided by the operator by moving her foot or knee as described above in connection with FIGS. 1 and 2.

There will now be described a circuit whereby the varying amplitude signal supplied by the transmitter-receiver combination described above is translated into varying speeds of the motor 12.

The motor speed control circuit 36 will be recognized as the same as that shown and described in the United States patent application Serial No. 87,567, filed February 7, 1961, and now abandoned. In this circuit a solid state controlled rectifier 40 having an anode 41, a cathode 42 and a gate 43 is used to control the current fed to the motor 12 from an alternating current voltage source (not shown) connected to a line cord 13. The motor 12 has its field winding 44 and armature winding 45 connected in series with the anode-cathode circuit 41–42 of the rectifier 40 and the source. Also connected in series with the source 13 is a voltage divider circuit comprising resistor 46, resistor 47 and adjustable resistor 48. The gate 43 is connected in series with a diode 49, a sensitivity control resistor 50, the resistor 47 and the armature winding 45 to the cathode 42. The diode 49 has such polarity as to permit only positive voltage to be applied to the gate 43. Resistor 51 and capacitor 52 are shunted across the gate-to-cathode circuit to reduce the gate sensitivity to commutator noise and thus prevent misfiring of the rectifier.

In operation, the reference voltage across resistor 47 overcomes the back E.M.F. of the armature (which is proportional to motor speed) to fire the rectifier. Thus, the speed setting is an inverse function of the resistance of the resistor 48 as set by the slider 53 and full range speed control could be effected by moving the slider 53 as described. However, this is not the mode of operation according to the present invention as will now be described.

As shown in FIG. 4, a PNP type transistor 35 is connected to apply the A.C. signal voltage from transformer 39 to the base 54 and emitter 55. The emitter 55 and collector 56 are connected to form a shunt circuit around the resistor 48. This circuit is quite unconventional. For example, alternating current voltage from 13 is impressed across the resistor 48 and thus across the emitter 55 and collector 56 of the transistor and no provision is made for a D.C. bias voltage on the base 54. Inasmuch as the rectifier 40 can conduct only on the half cycles when the anode 41 is positive, the emitter 55 is connected to the same side of the voltage source as the anode 41, while the collector 56 is connected to the other side of the voltage source.

In order to understand the operation of this circuit, it will first be described with regard to the application of a D.C. input signal. If a D.C. voltage is connected between the emitter 55 and the base 54 with the negative side to the base, the amplitude of this voltage will control the reference circuit 46, 47, 48 in the following manner. With zero D.C. voltage, the collector-to-emitter impedance is high and the total impedance (collector-to-emitter with resistor 48 in parallel) is such that the reference voltage cannot trigger the gate 43 of the rectifier 40. As the D.C. signal increases in amplitude, the collector-to-emitter impedance decreases, thus increasing the reference voltage and giving proportional speed control. When the D.C. signal is at its maximum the transistor 35 is saturated or fully conducting and the collector-to-emitter impedance is at its minimum. The reference voltage is at its maximum and the motor runs at maximum r.p.m.

We now consider the operation with A.C. signals applied to the emitter 55 and base 54. We need only consider the half waves during which the base 54 is negative because during the alternate half waves, when the base is positive, the transistor is merely driven further into cut-off condition. If the A.C. signal frequency is of the order of 1000 cycles per second or higher, the A.C. signal does not have to be synchronized with the 60 cycle A.C. power frequency supplied by 13. Since there are more than 16 negative half waves of signal voltage for each 60 cycle power half waves, good proportional speed control can be obtained with increasing amplitude of the signal voltage. However, if the signal frequency is considerably less than 1000 cycles/second and particularly where it is the same frequency as the power frequency at 13, then the start of the negative half wave of signal voltage should be synchronized or phased with the start of the positive half wave of power voltage. That is to say that the phase relation between the signal voltage applied to the base-emitter 54–55 and the power voltage applied from 13 to the emitter-collector 55–56 must be such as to cause emitter-collector current to flow when the anode 41 is positive with respect to the cathode 42 of the controlled rectifier 40. If this is too costly, then the input signal may be rectified and filtered into D.C.

Figure 5:
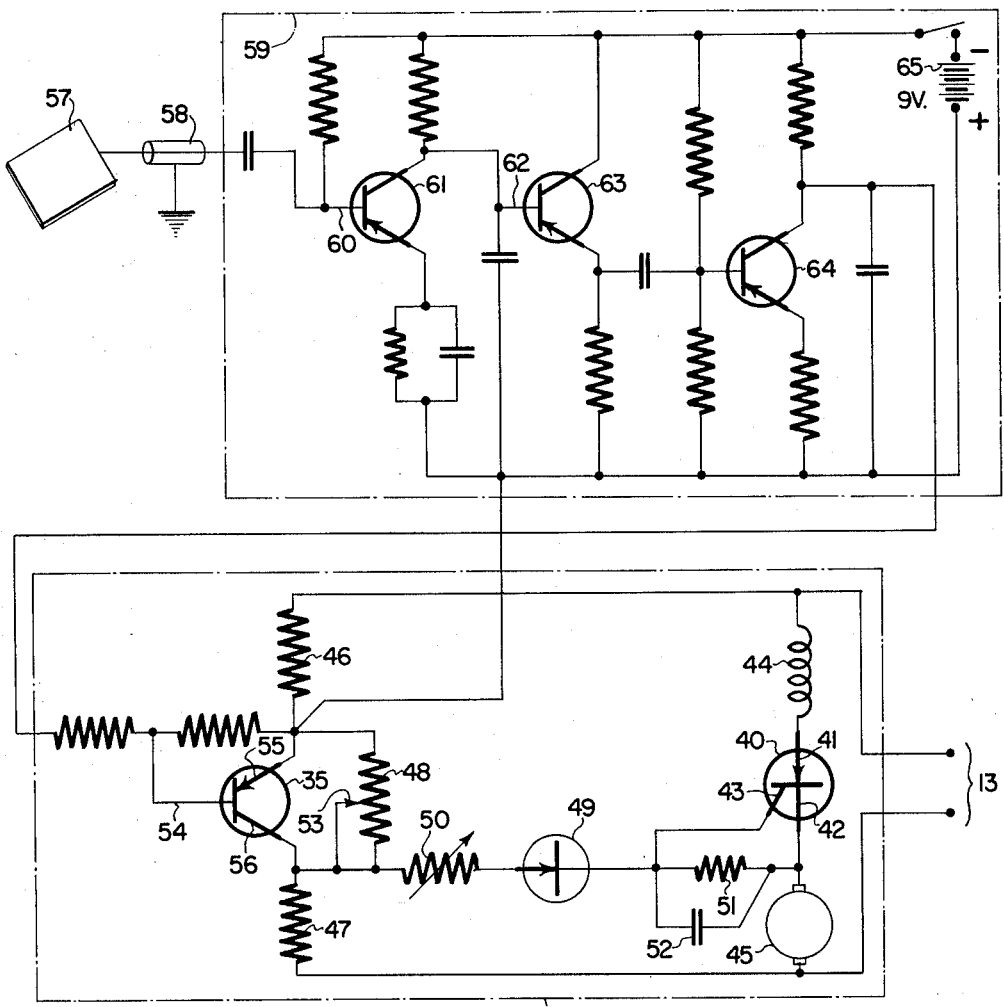
FIG. 5 is a schematic wiring diagram of an embodiment of this invention which utilizes the space induction field existing due to ordinary 60 cycle A.C. house wiring.

A system is shown in FIG. 5 for utilizing the stray 60 cycle hum picked up from the house wiring by the operator's body and transmitted by way of a plate 57 through a 50 ohm coaxial cable 58 to a high gain transistor audio amplifier 59 located in the sewing machine housing. Although this system is not "cordless," it eliminates about two-thirds of the components of the system of FIGS. 1, 2, 3 and 4 and there is no separately generated R.F. energy. It is a 60 cycle system.

As seen in FIG. 5, the 60 cycle signal picked up by plate 57 is fed to the base 60 of transistor 61 which is directly coupled to the base 62 of transistor 63 connected as an emitter follower for matching to the final output transistor 64. It will be seen by reference to FIG. 4, that the same control transistor 35 and speed control circuit 36 is used in FIG. 5 and direct coupling instead of the transformer 39 is employed.

A 9 volt battery 65 supplies power for the amplifier 59, but this may also be supplied by suitable rectification of the A.C. line voltage supplied at 13, if desired.

Operation of the circuit of FIG. 5 is the same as that described above in connection with FIG. 4, the operator's body coupling with respect to the plate 57 varying the input to the amplifier 59, thus to control the collector-to-emitter impedance of transistor 35 for controlling the speed of the motor 12. Since this is a 60 cycle system, the phasing of the supply voltage is important as pointed out above and the outlet plug connected to 13 should be properly polarized.

Having thus described the nature of this invention, what we claim herein is:

A system for controlling the speed of a series-wound, A.C. fed, electric motor responsively to the movement of an object relative to a fixed element, comprising circuit means for deriving an A.C. signal voltage having an amplitude responsive to the space coupling between said object and said fixed element, a source of A.C. power voltage, a solid state controlled rectifier having an anode, a cathode and a gate, circuit means connecting the field and armature windings of the motor in series with the anode-cathode circuit of the rectifier and the voltage source, a voltage divider circuit energized from said source and connected to said gate, a transistor having a base, an emitter and a collector, said emitter and collector being connected across a portion of said voltage divider circuit, and circuit means connecting said derived A.C. signal voltage to the base and emitter of said transistor.

References Cited by the Examiner

UNITED STATES PATENTS

| | | | |
|---|---|---|---|
| 2,089,677 | 8/1937 | Von Kromolin et al. | 328—5 X |
| 2,403,956 | 7/1946 | Schlesinger | 328—5 X |
| 2,786,972 | 3/1957 | Dreier et al. | 318—16 |
| 2,939,064 | 5/1960 | Momberg et al. | 318—345 X |
| 2,981,879 | 4/1961 | Taylor et al. | 318—246 |
| 2,981,880 | 4/1961 | Momberg et al. | 318—246 |
| 3,001,114 | 9/1961 | Hermann et al. | 318—16 |

ORIS L. RADER, *Primary Examiner.*

JOHN F. COUCH, *Examiner.*